United States Patent
Lin et al.

(10) Patent No.: US 11,270,250 B2
(45) Date of Patent: Mar. 8, 2022

(54) INTELLIGENT SERVICE AND CUSTOMER MATCHING USING AN INFORMATION PROCESSING SYSTEM

(71) Applicant: INTERNATIONAL BUSINESS MACHINES CORPORATION, Armonk, NY (US)

(72) Inventors: Cheng-Fang Lin, New Taipei (TW); Chih-Chiang Hung, Taipei (TW); Amanda PL Yang, Taipei (TW); Joey H. Y. Tseng, Taipei (TW); Ching-Chun Liu, Taipei (TW); Yu-Siang Chen, Minxiong Township (TW)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/791,521

(22) Filed: Feb. 14, 2020

(65) Prior Publication Data

US 2021/0256590 A1 Aug. 19, 2021

(51) Int. Cl.
*G06Q 10/08* (2012.01)
*G06Q 30/06* (2012.01)

(52) U.S. Cl.
CPC ... *G06Q 10/08355* (2013.01); *G06Q 10/0834* (2013.01); *G06Q 30/0633* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 5,995,042 A | * | 11/1999 | Durboraw, III | G01S 19/215 342/357.58 |
| 6,215,441 B1 | * | 4/2001 | Moeglein | G01S 5/009 342/357.25 |

(Continued)

FOREIGN PATENT DOCUMENTS

WO 2016/113602 A1 7/2016

OTHER PUBLICATIONS

Bruemmer, R., "Groceries minus the checkout line; Stores, Customers, catch on to trend that took time to take hold," Montreal Gazette [Montreal, Quebec] Jan. 19, 2019, p. A.3. (Year: 2019).*

(Continued)

*Primary Examiner* — Nicholas D Rosen
(74) *Attorney, Agent, or Firm* — Tutunjian & Bitetto, P.C.; Michael Petrocelli

(57) ABSTRACT

A computer implemented method for matching services to potential receivers of the services that includes registering at least one of service providers and service receivers as members to a service matching system. The service matching system collects data from the members. Permission to collect data from the members is revocable at any time by the members. The method further includes taking an order from a first service receiver to receive goods from a service provider; and calculating a route of the first service receiver to obtain the goods from the service provider. The method further includes matching the route of the first service receiver with a potential delivery route to a second service receiver having an order with the service provider; and offering a promotion to the first service receiver to deliver the order by the second service receiver with the service provider over the potential delivery route.

11 Claims, 7 Drawing Sheets

(56) References Cited

U.S. PATENT DOCUMENTS

| | | | |
|---|---|---|---|
| 7,281,236 B1* | 10/2007 | Galvin | G06F 8/38 717/104 |
| 7,590,550 B2 | 9/2009 | Schoenberg | |
| 8,290,817 B2* | 10/2012 | East | G06Q 30/06 705/26.1 |
| 8,438,199 B1* | 5/2013 | Cleveland, Jr | G06K 9/00476 715/769 |
| 8,620,576 B1* | 12/2013 | Papadopolo | G06Q 10/087 701/410 |
| 9,760,854 B1 | 9/2017 | Chowdhary | |
| 2002/0038233 A1 | 3/2002 | Shubov et al. | |
| 2003/0065588 A1* | 4/2003 | Rubinstenn | G01J 3/524 705/26.41 |
| 2005/0085215 A1* | 4/2005 | Kokko | H04M 1/72424 455/404.1 |
| 2005/0234768 A1* | 10/2005 | Wald | G06Q 30/0209 705/14.12 |
| 2006/0122790 A1* | 6/2006 | Fowler | G16B 50/20 702/20 |
| 2007/0192200 A1* | 8/2007 | Weng | G06Q 30/0609 705/26.35 |
| 2009/0144661 A1* | 6/2009 | Nakajima | G06F 3/04817 715/835 |
| 2014/0012498 A1* | 1/2014 | Gustafson | G01C 21/3423 701/468 |
| 2014/0057235 A1* | 2/2014 | Kellum | G09B 23/288 434/265 |
| 2015/0088735 A1* | 3/2015 | Howe | G06Q 20/341 705/41 |
| 2015/0227975 A1* | 8/2015 | Momin | G06Q 30/0207 705/14.1 |
| 2015/0368044 A1* | 12/2015 | Olson | G06Q 10/087 700/216 |
| 2016/0078571 A1* | 3/2016 | Singh | G06Q 30/0641 705/14.66 |
| 2016/0364823 A1 | 12/2016 | Cao | |
| 2017/0227515 A1* | 8/2017 | Euler | G01N 33/227 |
| 2017/0242923 A1* | 8/2017 | Viro | G06F 16/951 |
| 2018/0018629 A1* | 1/2018 | Elston | G06Q 30/0635 |
| 2018/0053129 A1 | 2/2018 | Cheng et al. | |
| 2018/0075407 A1* | 3/2018 | Chivukula | G06Q 10/0834 |
| 2018/0341919 A1* | 11/2018 | Luhman | G01C 21/3476 |
| 2019/0080286 A1* | 3/2019 | Srinivasan | G06Q 10/0834 |
| 2021/0082021 A1* | 3/2021 | Sharma | G06Q 30/0627 |

OTHER PUBLICATIONS

Mell et al. "The NIST Definition of Cloud Computing", NIST Special Publication 800-145, 2011, 7 pages.

* cited by examiner

US 11,270,250 B2

INTELLIGENT SERVICE AND CUSTOMER MATCHING USING AN INFORMATION PROCESSING SYSTEM

BACKGROUND

The present invention generally relates to information processing, and more particularly to setting requirements for project implementation.

The service economy can be inefficient in matching service providers and consumers. Many factors contribute to this inefficiency. For example, consumers have difficulties identifying appropriate service providers to meet their needs; and consumers cannot readily distinguish relative service provider quality. In addition, there is an inherent knowledge gap between consumers and service providers. Consequently, consumers and service providers experience difficulty communicating with one another.

SUMMARY

In accordance with one aspect of the present disclosure, methods, and computer program products have been provided for intelligent service matching.

In one embodiment, the computer implemented method for matching services to potential receivers of the services includes registering at least one of service providers and service receivers as members to a service matching system, wherein the service matching system collects data from the members, wherein permission to collect data from the members is revocable at any time by the members. The method further includes taking an order from a first service receiver to receive goods from a service provider. The method determines a route of the first service receiver to obtain the goods from the service provider. The method further includes matching the route of the first service receiver with a potential delivery route to a second service receive having an order with the service provider. The method offers a promotion to the first service receiver to deliver the order by the second service receiver with the service provider over the potential delivery route.

In another aspect, the present disclosure provides a system for matching services of service providers with service receivers. In one embodiment, the system includes an interface for receiving data from at least one of service providers and service receivers for inclusion into a membership database, wherein the services receives include at least a first service receiver and a second service receiver for receiving goods form the service providers. The system further includes a route planner for determining a potential delivery route of a first service receiver to obtain the goods from a service provider. The system further includes a matching engine for matching the potential delivery route of the first service receiver that have an order with the service provider with the location of a second service receiver having an order with a same service provider. The system further includes a promotion generator that offers a promotion to the first service receiver to deliver the order by the second service receiver with the service provider over the potential delivery route.

In yet another aspect, a computer program product is provided for providing service matching from service providers to service receivers. The computer program product including a computer readable storage medium having program instructions embodied therewith, the program instructions executable by a processor to cause the processor to register at least one of service providers and service receivers as members to a service matching system, wherein the service matching system collects data from the members, wherein permission to collect data from the members is revocable at any time by the members. The computer program product may also cause the processor to take an order from a first service receiver to receive goods from a service provider; and to calculate a route of the first service receiver to obtain the goods from the service provider. The computer program product can also match the route of the first service receiver with a potential delivery route to a second service receiver having an order with the service provider; and offer a promotion to the first service receiver to deliver the order by the second service receiver with the service provider over the potential delivery route.

BRIEF DESCRIPTION OF THE DRAWINGS

The following description will provide details of preferred embodiments with reference to the following figures wherein.

DETAILED DESCRIPTION

The methods, systems, and computer program products described herein can provide for intelligent service matching. Service matching includes matching the services provided by service providers, such as stores and restaurants, with different potential service receivers, e.g., consumers, wishing to receive goods/services from the service providers. More specially, the methods, systems and computer program products may employ a primary service receiver, which is a consumer making an initial purchase, as delivery agents to secondary service receivers. The secondary service receivers are consumers that are not at a physical location of the service providers from which they second service receivers wish to purchase goods/services.

In some circumstances when a customer, e.g., potential service receiver, needs services/goods, the customer checks if available service providers can provide the service/goods he needs. For example, if a customer wants to buy a type of food, the consumer can personally go to the service provider types in the area that serve food, e.g., restaurants, and ask what they serve; a customer can directly contact the service provider, e.g., restaurant, via phone or electronic communication, e.g., email; or the customer could call a service that delivers product for the service provider.

As will be further described herein, the methods, systems and computer program products that are described herein can leverage existing consumers, e.g., a first potential service provider, who happen to be on the same route to provide services as delivery agents to other existing consumers, e.g., a second potential service provider. The methods, systems and computer program products provides a mechanism for business owners to promote and extend their business opportunities by leveraging resources from existing consumers, e.g., potential service receivers. In some examples, the mechanism for the business that can dynamically match or predict the potential services provided by and to the customers based on the current or historical behavioral data of customers, e.g., potential service receivers. In some examples, the methods, systems and computer program products may also provide a mechanism to offer benefits to customers, e.g., first service receivers, as the incentive for them to be willing to provide services to other customers, e.g., second service receivers. The methods and systems of the present disclosure are now described in greater detail with reference to FIGS. 1-7.

Figure 1:
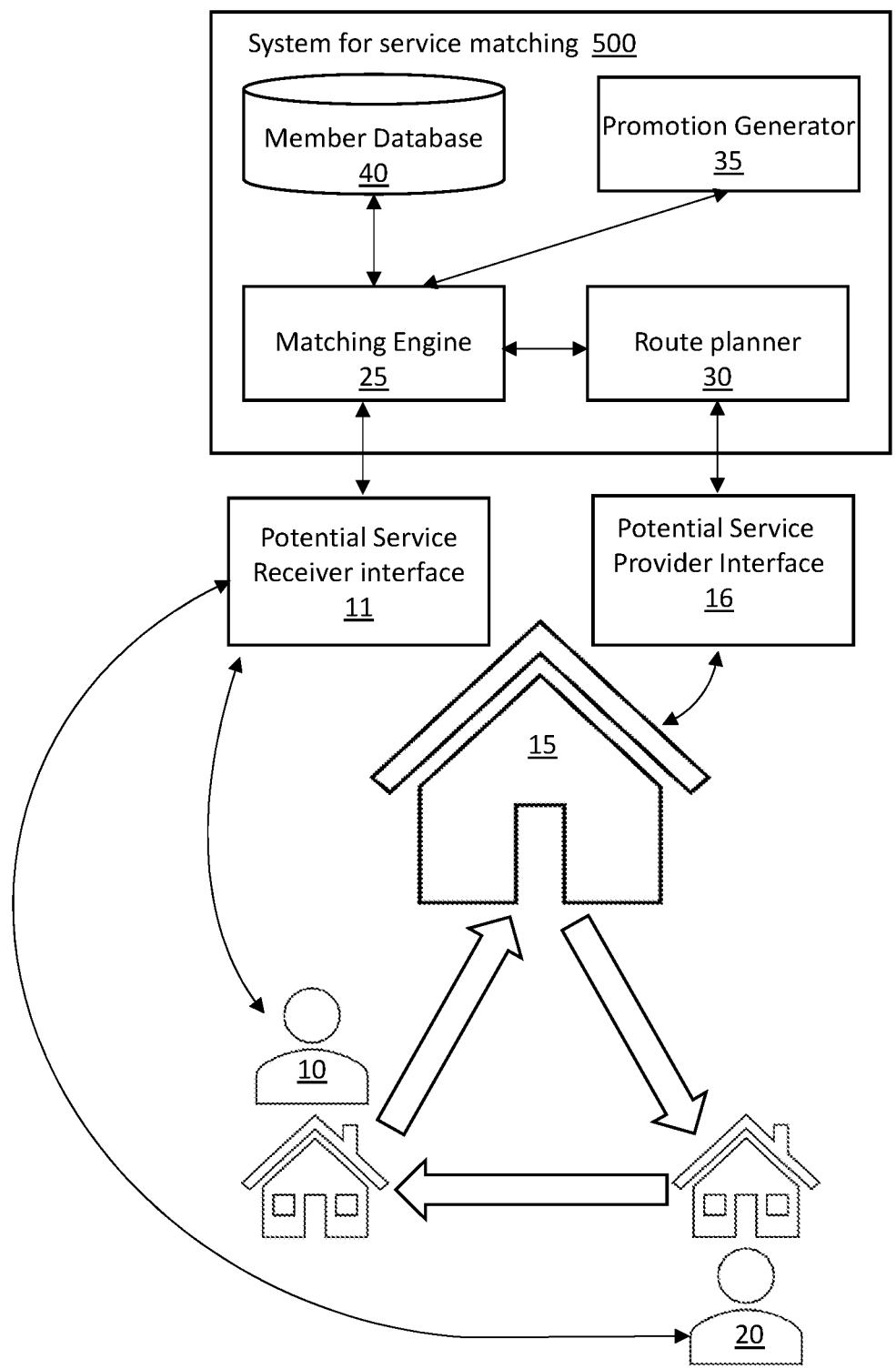
FIG. 1 is an illustration of an example environment in which a potential receiver is purchasing products from a service provider at their location, e.g., in-store, to which the methods, systems and computer program products for providing intelligent service matching may be applicable, in accordance with one embodiment of the present disclosure.
Figure 2:
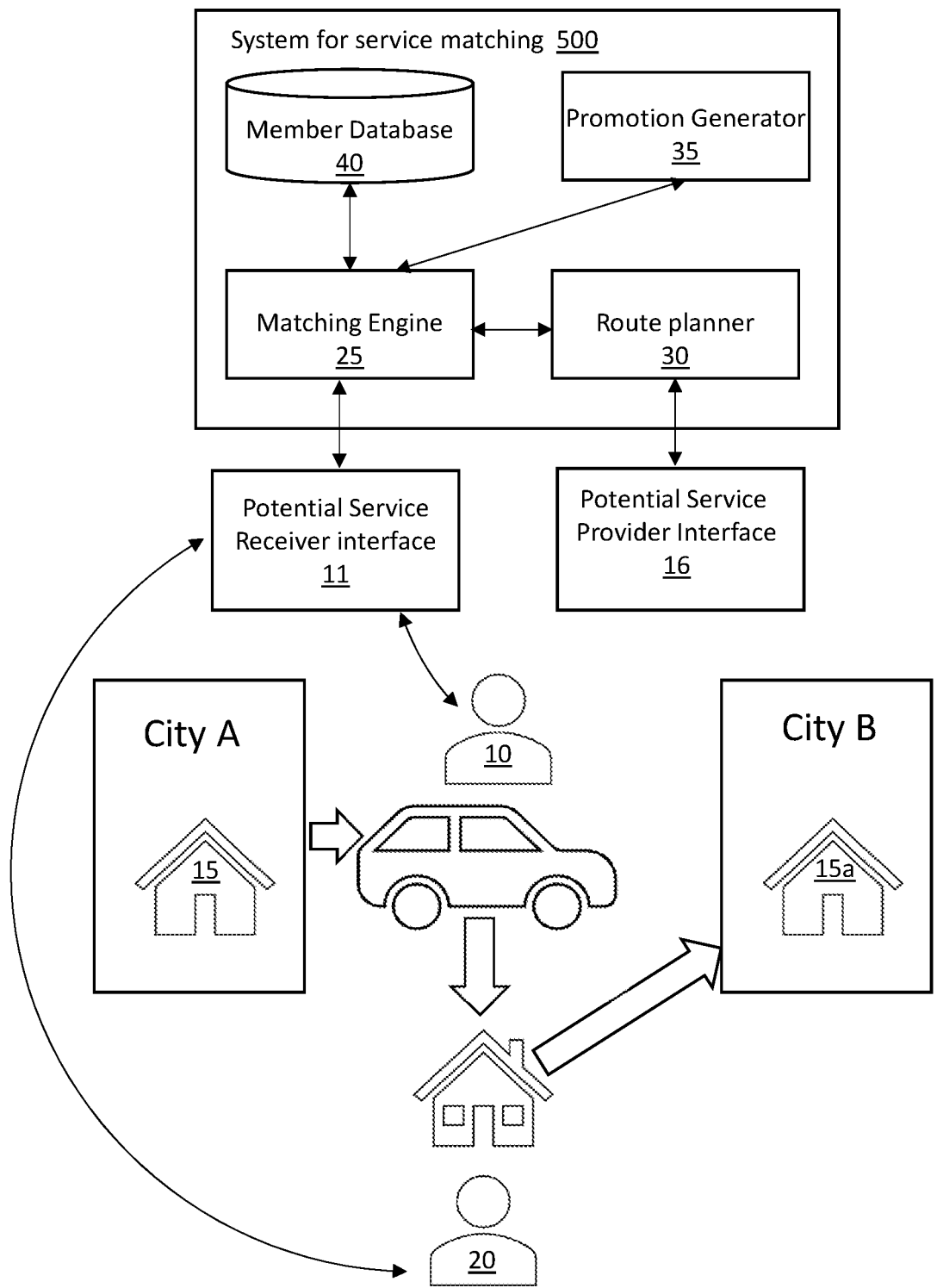
FIG. 2 is an illustration of an example environment in which a potential receiver is purchasing products from multiple service provider by reservation, to which the methods, systems and computer program products for providing intelligent service matching may be applicable, in accordance with one embodiment of the present disclosure.

FIGS. 1 and 2 are illustrations of an example environments to which the methods, systems and computer program products for providing intelligent service matching may be applicable. In the example depicted in FIGS. 1 and 2, the consumers and services provides are in the food service industry. In these examples, the consumers are first and second potential service receivers identified by reference numbers 10 and 20, while the service providers are potential service providers identified by reference numbers 15, 15a, which are restaurants.

Figure 3:
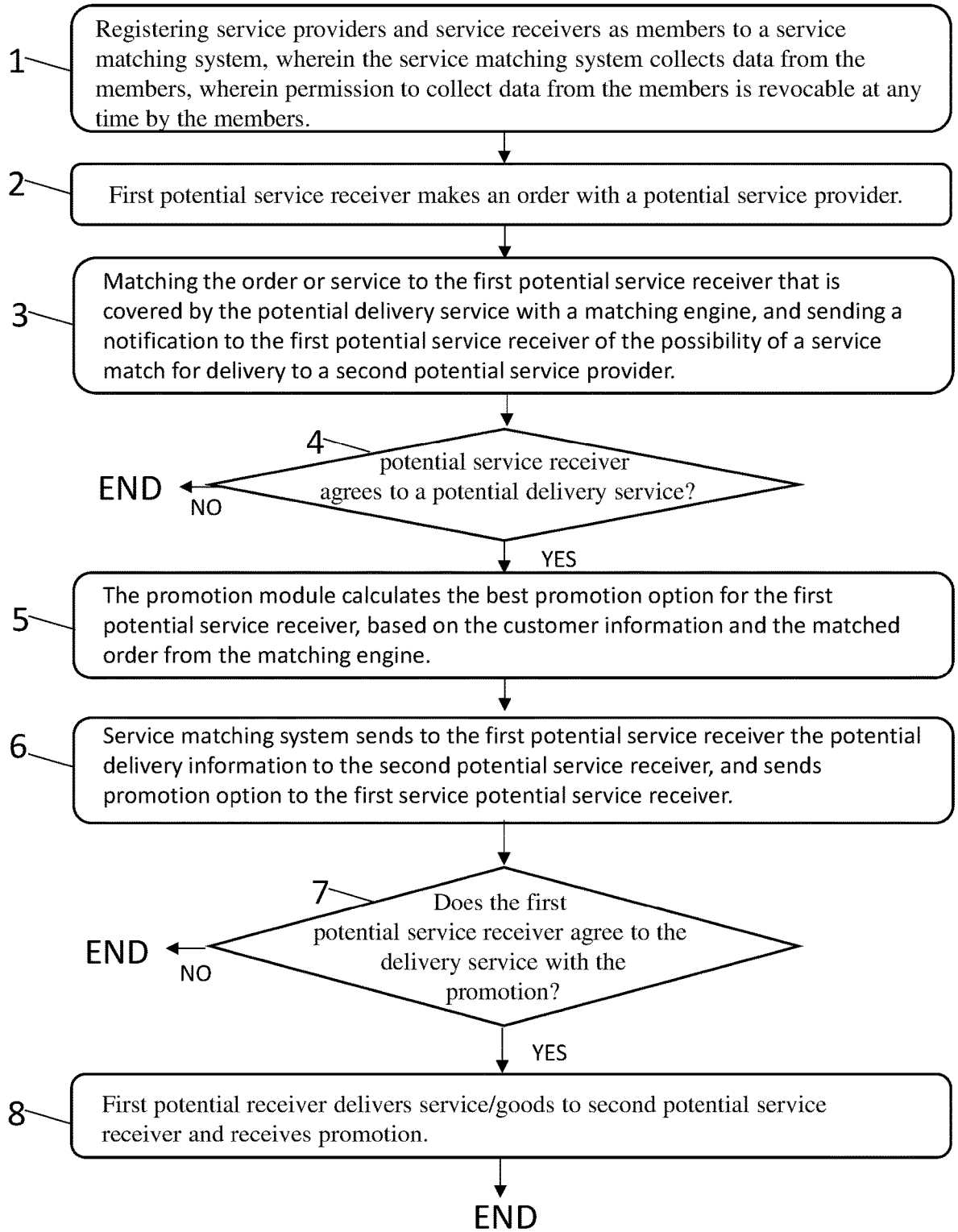
FIG. 3 is a flow diagram showing a method for providing service matching to customers, in accordance with the present disclosure.
Figure 4:
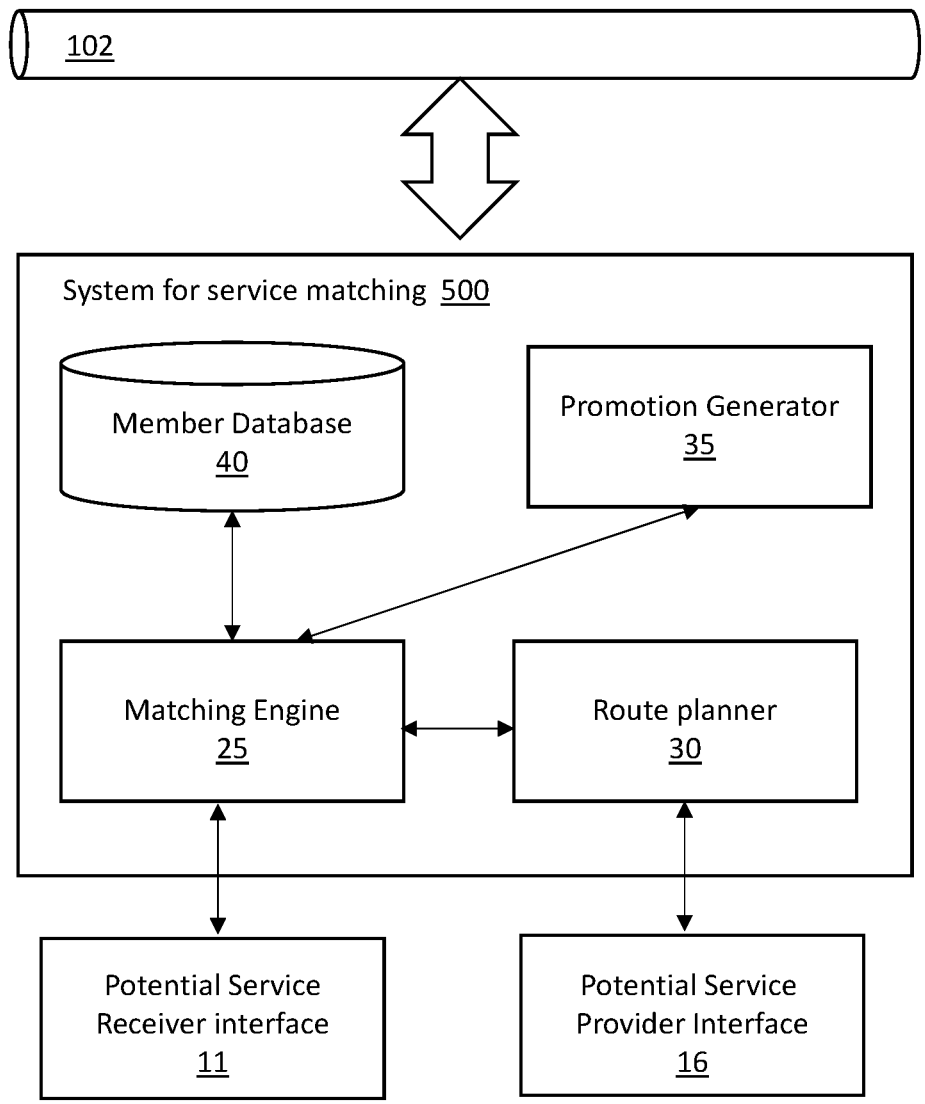
FIG. 4 is a flow/block diagram depicting a first embodiment of a system for providing service matching to customers, in accordance with the present disclosure.

FIG. 1 is an illustration of an example environment in which a first potential receiver 10 is purchasing products from a service provider 15 at their location, e.g., in-store (restaurant), to which the methods, systems and computer program products for providing intelligent service matching of a delivery service by the first potential receiver 10 after receiving their order to a second potential receiver 20, in which the delivery is to the second potential receivers residence, and the first potential receiver 10 receives a promotion for performing the delivery service. FIG. 2 is an illustration of another example environment in which a first potential service receiver 10 is purchasing products from multiple service providers 15, 15a. In this example, while the first potential receiver 10 is traveling from the first service provider 15 after receiving their first order, the first potential receiver 10 makes a delivery to a second potential receiver 20, while the first service provider 15 is on their travels to a second service provider 15a. In this example, the first service receiver 10 receives a promotion for performing the delivery service. It is noted that FIGS. 1 and 2 depict only some examples of environments, in which the methods, systems and computer program products for intelligent service matching is applicable. FIG. 3 is a flow diagram showing a method for providing service matching to customers. FIG. 4 is a flow/block diagram depicting a first embodiment of a system for providing service matching to customers.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the implementation of the method may include a registration step at block 1 of FIG. 3. The system for providing intelligent service matching 500 (hereafter service matching system) that depicted in FIG. 4. includes a member database (DB) 40. The registration step creates an account entry for the registered service provider 15, and for consumers 10, 20 (hereafter referred to as potential service receivers 10, 20). The account entry may be a consumer profile 43 for the potential service receivers 10, 20, and a service provide profile 45 for the potential service providers 15. As will be described hereafter, a first potential service receiver 10 is the consumer that can make an initial interaction, e.g., purchase, from a service provider 15, in which the first potential service receiver 10 is conserved for a potential delivery route as a delivery agent of services/goods to a second potential service receiver 20.

Referring to FIGS. 1 and 2, a potential service provider 15 is a form of a service, e.g., a service business, which can be a store selling a service, a future reservation by a consumer that is a member to the service, or other nearby consumer member that has joined, e.g., registered, with the service.

Referring to FIG. 4, the system for providing intelligent service matching 500 includes a potential service provider interface 16 at which the service providers can register. The interface 16 may be any connection with a mechanism by which the service providers can enter information into the service matching system 500, which can be wireless or wired. For example, the potential service provider 15 can register with the service matching system 500 through the interface 16 via a mobile electronic devices, e.g., a smart phone and/or tablet, wirelessly. The registration of the potential service provider 15 may include providing the service matching system 500 with identify information, address information, and information regarding the product/service provided by the potential service provider 15.

Referring to FIGS. 1 and 2, a potential service receiver 10 is a member, e.g., consumer 10, 20 who is placing, or has placed, an order for an item that is provided by a service provider 15, e.g., business, or is interested in the items provided by the business. As will be described herein, a first potential service receiver 10 is the party that is first interacting with a service provider 15 for purchasing a goods/service from the service provider 15. The first potential service receiver 10 can be matched by the service matching system 500 as a potential delivery service of goods/services from a potential service provider 15 that the first potential service receiver 10 has purchased goods/services from as the means to deliver products/services to a second potential service receiver 20.

Referring to FIG. 4, the system for providing intelligent service matching 500 includes a potential service receiver interface 11 at which the service receivers, e.g., consumers 10, 20, can register. The potential service receiver interface 11 may be any connection with a mechanism by which the service receivers, e.g., consumers 10, 20 can enter information into the system 500, which can be wireless or wired. For example, the consumers 10, 20 can register with the system 500 via a mobile electronic devices, e.g., a smart phone and/or tablet, wirelessly. The potential service receiver interface 11 may be the mechanism by which at least one of the first potential service receiver and the second potential service receiver may make a purchase order of goods/services from a potential service provider 15.

The registration process may include receiving permission from the potential service receiver, e.g., consumers 10, 20, for data collection. In some embodiments, in response to receiving permission from a consumer 10, 20 for data collection, the method may begin with registering users, e.g., potential service receives 10, with the system for providing intelligent service matching 500. The data collected may be employed to provide a user profile, e.g., consumer profile 43, as depicted in FIG. 4. The registration process may also include receiving permission from the potential service providers 15. The data collected from the potential service providers 15 may be employed to provide a service provider profile 45, as depicted in FIG. 4.

Referring to FIG. 4, the consumer profile 43 and the service provide profile 45 may be stored in a member database 40. The member database keeps the order or historical data from the members to the service 500, e.g., the members being the service providers 15 and consumers 10, 20. The data can be matched by the matching engine according to the area that is going to be delivered. The membership database 40 may be stored on any type of memory, such as hardware memory that can include, but is not limited to random access memory (RAM), a read-only memory (ROM), an erasable programmable read-only memory (EPROM or Flash memory), a static random access memory (SRAM) and combinations thereof. The membership database 40 can be a type of cloud based memory. Additionally, the consumer profile 43 and service provider profile 45 may be modules of memory in the member database 40.

To the extent implementations of the invention to collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to FIG. 3, the method can include the potential service receiver 10 making an order with a potential service provider 15 at block 2. At this stage of the process flow, the potential service receiver 15 may be a customer that is making an order for the potential service provider, and is referred to as a first potential service receiver 10. It is the first potential service receiver 10 that the service matching system 500 may provide the offer to provide a delivery service to another potential service receiver, i.e., a second potential service receiver 20. The potential service receiver 10 provides the order information and/or the predicated route of the potential service receiver 10 after physically receiving the service from the potential service provider 15. The order information and/or route may be provided directly to the system 500 through the potential service receiver interface 11 by the potential service receiver, e.g., consumer 10. In some embodiments, the order information and/or route may be provided by the potential service receiver 10, e.g., consumer 10, to the potential service provider 15, and the potential service provider 15 can then enter the order information and/or route to the system 500 through the potential services provider interface 16.

Referring to FIG. 3, the method may further include the system 500 matching the possible order, e.g., original sale of product or service to the potential service receiver 10 (also referred to as first consumer 10), that is covered by the potential delivery service, and sends a notification to the potential service receiver 10 of the possibility of a service match at block 3. A service match includes a potential delivery service to be performed by the potential service receiver 10, e.g., first consumer 10, to deliver the product of a service by the potential service provider 15 to another potential service receiver 20, e.g., the second consumer 20.

Referring to FIG. 3, in some embodiments, the matching of the order, e.g., order of the original service or product to the first consumer 10, to a potential delivery to a second consumer, can begin with a route planner 30. In some embodiments, the route planner 30 collects route information, e.g., predicted routes and historical route data, from potential service providers 10. This collection of data may include data provided through the potential service provider interface 16 or from the data that is saved in the memory database 40. The route planner has access to a series of maps indicating the locations of the first potential service receiver 10, the second potential service receiver 15, and the potential service provider 20. The maps may be saved in memory of the service matching system 500. In other embodiments, the maps may be accessed by the route planner 30 over the internet. The route planner 30 may also have access to global positioning systems (GPS) that can help to track the location of the first and second consumers 10, 20. Using the location of the first and second service providers 10, 20, the location of the potential service provider 15, the route planner can use artificial intelligence to provide a potential delivery route to the first potential service provider 10.

Matching of the original service or product to a potential delivery to a second consumer at block 3 further employs the use of a matching engine 25. The matching engine 25 may include at least one module of memory including instructions for matching routes of the potential service provides to a potential delivery route, and at least one hardware processor for performing the instructions in providing the matching step described in block 3 of FIG. 3. The matching engine 25 considers that the first potential service receiver 10 has made an order to the potential service provider 15. The matching engine 25 may also consider whether a second potential service receiver 20 has also may an order to the same potential service provider 15 that the first potential service receiver 10 has made an order to. Considering that information, the matching engine 25 considers the routes, e.g., potential delivery routes, that have been calculated by the route planner, and can then match the route of the first potential service receiver 10 in their travels to obtain the services/goods of the potential service provider 15, and then determine if the potential delivery route to the second potential service receiver 20 is within range of the normal routes the first potential service receiver 10 may also be taking. If the normal route that the first potential service receiver 10 would take in traveling to receive their goods overlaps (or is proximate to) the potential delivery route to the second service provider 20 there is a match that has been determined by the matching engine 25, which may be provided to the first potential receiver 10.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The matching engine 25 can provide a number of functions that can include using the data from the route planner 30 to calculate the area that that can be covered for the delivery. The calculated delivery area includes the area to potential receivers of delivered product, e.g., second customers 10, that the first potential service receiver 10, e.g., first consumer 10, can reach consistent with their travels that are associated with the service they are receiving. The matching engine 25 can use the calculated delivery area to match the order from the ordered database, e.g., member database 40, for a possible delivery option to the potential delivery service provided by the potential service provider 15.

The matching engine 25 may be provided by some form or artificial intelligence providing device to determine matches. In some embodiments, the matching engine 25 may include neural networks, expert systems, genetic algorithms, intelligent agents, logic programming, and fuzzy logic. Neural network artificial intelligence is based loosely upon the cellular structure of the human brain. Cells, or storage locations, and connections between the locations are established in the computer. As in the human brain, connections among the cells are strengthened or weakened based upon their ability to yield "productive" results. The system uses an algorithm to "learn" from experience. Neural nets are an inductive reasoning method. Expert systems are usually built using large sets of "rules." Genetic algorithms utilize fitness functions, which are relationships among criteria, to grade matches.

In one example, the matching engine 25 is an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring to FIG. 3, in some embodiments, the method may proceed to block 4, at which the first potential service receiver 10 receives a notice of a potential delivery route, and the potential service receiver 10 makes a decision whether the potential service receiver 10 wishes to agree to potentially providing a service delivery to a second potential service receiver 20. If the first potential service receiver 10 does not agree to be a potential delivery option for the potential delivery route, the process flow of the method ends. In some embodiments, the route planner 30 triggers the notification to the potential service provider 15 for a possible delivery option to the matching engine 25. The matching engine 25 can then send the notification to the potential service receiver 20 to confirm the service. The request for confirmation of the service can be sent to the potential service receiver 10 through the potential service receiver interface 11.

If the first potential service receiver 10 does agree to be a potential delivery option for the potential delivery route, the method may continue to providing a promotion to the first potential service receiver 10. The promotion is intended to motivate the first potential service receiver 10 to accept the potential delivery route, and to deliver the goods and/or services from the service provider 15 to a second potential service receiver 20.

In the circumstances in which the first potential service receiver 10 selects to confirm the request for a potential delivery route for delivering goods from the potential service provider to a second potential service receiver 20, the method may continue to block 5 of FIG. 3, which includes selecting a promotion option. In block 5, the service matching system 500 uses the possible order and the customer information to set a best promotion option. Referring to FIG. 3, providing the promotion option to the first potential service receiver 10 can be provided by a promotion module 35 of the system 500.

Block 5 of FIG. 3 includes the service matching system 500 uses the possible order and the customer information to get the best promotion option. The promotion module 35 calculates the best promotion option for the specific customer, e.g., first potential service receiver 10, based on the customer information and the matched order from the matching engine 25. In some examples, to calculate a promotion that would entice a first potential service receiver 10, the promotion module 35 considers characteristics, such as the home location, and travel habits, of the first potential service receiver 10, and how those locations relate to the delivery location for the second potential service receiver 20. The promotion module 35 may also consider what types of items could be offered to the first potential service receiver 10 to entice the first potential service receiver 10 to perform delivery duties for the potential service provider 15.

In some embodiments, at block 5 of the method depicted in FIG. 3, the matching engine 40 sends the customer's information, e.g., first potential service receiver 10, and the possible delivery option to the promotion module 35 to get the best promotion option for the customers, e.g., first potential service receiver 10.

In one embodiments, the promotion can include a reduced price for the service being provided by the potential service provider 15. For example, the promotion can be a reduction in the price of the original product being purchased by first the potential service receiver 10. For example, after receiving their order from the potential service provider 15, the first potential service receiver 10 can be offered a 15% reduction in the price of their order in the event they deliver an order of goods from the potential service provider 15 to the second potential service receiver 20.

In another embodiment, the promotion can also be an additional product added to the order by the first potential service receiver 10. For example, if the first potential service receiver 10 orders a hamburger from a potential service provider 15, the promotion may be an order of fries for not charge, it the first potential service receiver 10 delivers a produced from the same potential service provider to a second potential service receiver 20.

Referring to FIGS. 3 and 4, the promotion module 35 can then send a promotion to the matching engine 25, in which the matching engine can then send information that includes the possible delivery option and promotion information back to the route planner 30, which in turn notifies the potential service receiver 10 through a potential service receiver interface 11. Block 6 of the method depicted in FIG. 3 includes the system 500 sending the possible order information and promotion option to the potential service receiver 10.

For example, at this stage of the process flow, the possible order information and promotion option may include the potential delivery route. For example, the possible order information may include the address and identity of the second potential service receiver 20. In addition to the possible order information, the promotion is also presented to the first potential service receiver 10. All of this information may be provided over the potential service receiver interface 11.

At block 7 of the method depicted in FIG. 3, the first potential service receiver 10 is presented with the opportunity to accept the promotion, and deliver the goods to the second potential service receiver 20. The first potential service receiver 10 also has the option to not accept the offer to deliver the goods to the second potential service receiver 20. The option is presented to the first potential service receiver 10 on the potential service provider interface 11 of the system 500 that is depicted in FIG. 4.

If the first service receiver 10 decides to not accept the offer to deliver the goods, the method may end. If the first service receiver 10 accepts the offer to deliver the goods at block 7, the method may progress to block 8 of FIG. 3. At block 8 of the method depicted in FIG. 3, the service is delivered by the first service receiver 10 to the second service receiver 20. Block 8 of FIG. 3 includes the service being delivered by the potential service receiver 10 who can also get the promotion for performing the delivery.

In one example depicted in FIG. 1, a first potential service receiver 10 goes to a fast food restaurant, i.e., potential service provider 15, to order a fast food product to go. The first potential service receiver 10 and the potential service provider 15 is registered with the system 500 using the methods described above in block 1 of FIG. 3. Data on the first potential service receiver 10 may be saved in the membership database 30 of the system 500. When the first potential service receiver 10 orders from the potential service provider 15, the matching system 500 recognizes the identity of the first potential service receiver 10 and through the matching engine 25 and the member database 40, the system 500 finds a potential match for another party, e.g., second potential receiver 20, for delivery of goods from the same service provider 15 that the first potential receiver 10 is receiving goods from. The second potential receiver 20 may be another member within the member database 40. In this example, the second potential receiver 20 may be a neighbor of the first potential receiver 10. In this example, the second potential receiver 20 may have also made an order with the same potential service provider 15 that the first potential receiver 10 has ordered goods from. The matching of the first and second potential receivers 10, 20 is described in further detail for block 3 of the method described in FIG. 3.

In this example, the system 500 may then ask the first potential receiver 10 through the potential receiver interface 11 if the first potential receiver 10 would be willing to deliver goods to the second potential receiver 10 in combination with the first potential receiver 10 purchasing their goods from the potential service producer 15. Further details on this step are provided in the above description of block 4 of FIG. 3.

The system also offers a promotion to the first potential receiver 10 for providing delivery services to the second potential receiver 20, which happens to be the neighbor of the first potential receiver 10. The promotion is offered through the first potential receiver interface 11. For example, if the original order for the first potential receiver 10 is a hamburger, the promotion to perform the delivery service to the second potential receiver 20 may be a free additional item to the first potential receiver's order, such as a free apple pie or free order of ice cream. Further details regarding this step of this example can be found in the descriptions of blocks 5 and 6 of the method depicted in FIG. 3. In some embodiments, at this point of the process flow, the first potential receiver 10 may accept the proposal over the first potential receiver interface 11, may then receive the contents of the original order from the potential service provider, e.g., restaurant, as well as the contents of the promotion for accepting the delivery service, and may then deliver the order of goods for the second potential receiver 20 from the potential service provider 15 to the second potential receiver 20. In this example, the contents of the order for the second potential receiver 20 may have been entered into the systems by the second potential receiver 20. The second potential receiver 20 may also employ the potential receiver interface 11 to register with the service matching system 500, as well as enter order information for the goods they wish to order from the potential service provider, e.g., restaurant.

In another example depicted in FIG. 2, distinguished from when the first potential receiver 10 is making an order in person, picking a product up in person, and returning home with their product, the service matching system 500 may make a potential delivery route that takes into account the first potential service receiver 10 traveling from one potential service provider 15 to a second potential service provider 15a in a single session, in which the potential delivery route to a second potential receiver 20 is at a time between the first potential receiver 10 is traveling from the first potential provider 15 to the second potential provider 15b.

This may be referred to as a two reservation example of using the service matching system 500.

For example, the first potential receiver 10 may make a first reservation at a restaurant at a first location. The first potential receiver 10 may using the potential receiver interface 11 to make a reservation with the restaurant, e.g., restaurant A, at the first location, e.g., city A. The first potential receiver 10 may also make a reservation through an online application for the potential service provider 15, 15a over the potential receiver interface 11.

In this example, the first potential receiver 10 has a profile 43 in the membership database that includes their travel characteristics. From the reservation that is made by the first potential receiver interface 11, the system 500 can determine using the profile 43 for the first potential receiver 10 a likely pattern of reservations and locations for the reservations that the first potential receiver 10 will follow. For example, from the type of service provider 15 at which the reservation is made, and the time of the reservation, as well as the location of the reservation, the system 500 can determine that in these circumstances the first service receiver 10 after receiving the goods of the service provide provider 15, the first service receiver 10 may travel to a second type of service provider 15a at a second location. For example, the service matching system 500 can determine from a reservation at a first restaurant, e.g., restaurant A, in a first city, e.g., city A, at a first time, e.g., 6:30 PM, by the first potential service receiver 10, that according to the member database 40 that the first potential service receiver 10 after leaving the first restaurant will attend a second restaurant, e.g., restaurant B, in a second city, e.g., city B, at approximately a second time, e.g., 8:00 PM. For example, at the first service provider 15, restaurant A, in the first city, e.g., city A, the first service receiver 10 may have dinner, and at the second service provider 15a, restaurant B, in the second city, e.g., city B, the first service receiver 10 may have desert. From this pattern of travel, the system 500 can then estimate that the first service receiver 10 may be available to deliver goods from the first restaurant 15 to a second service receiver 20 in city B. This route may be during a time at which a second potential receiver 20 may be desiring to receive a delivered product/service from the first service provider 15.

A second potential receiver 20 may also be registered with the system 500, and may also have a profile in the membership database 40 characterizing their purchase of services history and trends for services usage. The second potential receiver 20 may order products from the first service provider 15, e.g., first restaurant, e.g., restaurant A, in the first city, e.g., city A, and the second potential receiver 20 may live in the second city, e.g., city B. The second potential receiver 20 may order products from the first service provider 15, e.g., restaurant A, over the service provider interface 11.

The system 500 can calculate a potential delivery route for the first potential receiver 10 to deliver goods from the first service provider 15, e.g., restaurant A, during the travels of the first potential receiver from the first location, e.g., city A, at which the first service provider 15 is present to the second location, e.g., city B, at which the second service receiver 20 and the second service provider 15a is present. The route for a potential delivery may be calculated by the route planner 30, and the matching of the service receivers 10, 20, and the services for delivery by the service provider 15 in the potential delivery route may be calculated by the matching engine 25. Further details of how the system 500 can provide the potential delivery route and the matching of service receivers 10, 20 and potential service provides 15, 15a are further described with reference to blocks 2 and 3 of the method described with reference to FIG. 3.

In this example, the system 500 provides a promotion to the first service receiver 10 to deliver goods from the first service provider 15, e.g., restaurant A, to the second service receiver 20 second city, i.e., city B, during his travels from the first service provider 15 to the second service provider 15a. For example, the promotion may be a reduction in the purchase price of good from the first service provider 15 for future purchases, e.g., a 15% reduction in the purchase price of future goods. The first service receiver 10 may receive the promotion offer over the service receiver interface 11, which the first service receiver 10 may accept or may reject through the service receiver interface 11.

Referring to FIG. 4, the present disclosure provides a system 500 for intelligent matching of services from service providers to service receivers 10, 20. In one embodiment, the system 500 includes an interface 11, 16 for receiving data from at least one of service providers 15, 15a and service receivers 10, 20 for inclusion into a membership database 40. The system further includes a route planner 30 for determining a potential delivery route of a first service receiver to obtain the goods from a service provider. The system further includes a matching engine 25 for matching the potential delivery route of the first service receiver that have an order with the service provider with the location of a second service receiver having an order with a same service provider. The system further includes a promotion generator 35 that offers a promotion to the first service receiver to deliver the order by the second service receiver with the service provider over the potential delivery route. Each of the components for the system 500 for intelligent matching of services that is depicted in FIG. 4 may be interconnected via a system bus 102.

Any of the systems or machines (e.g., devices) shown in FIG. 4 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIG. 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 5:
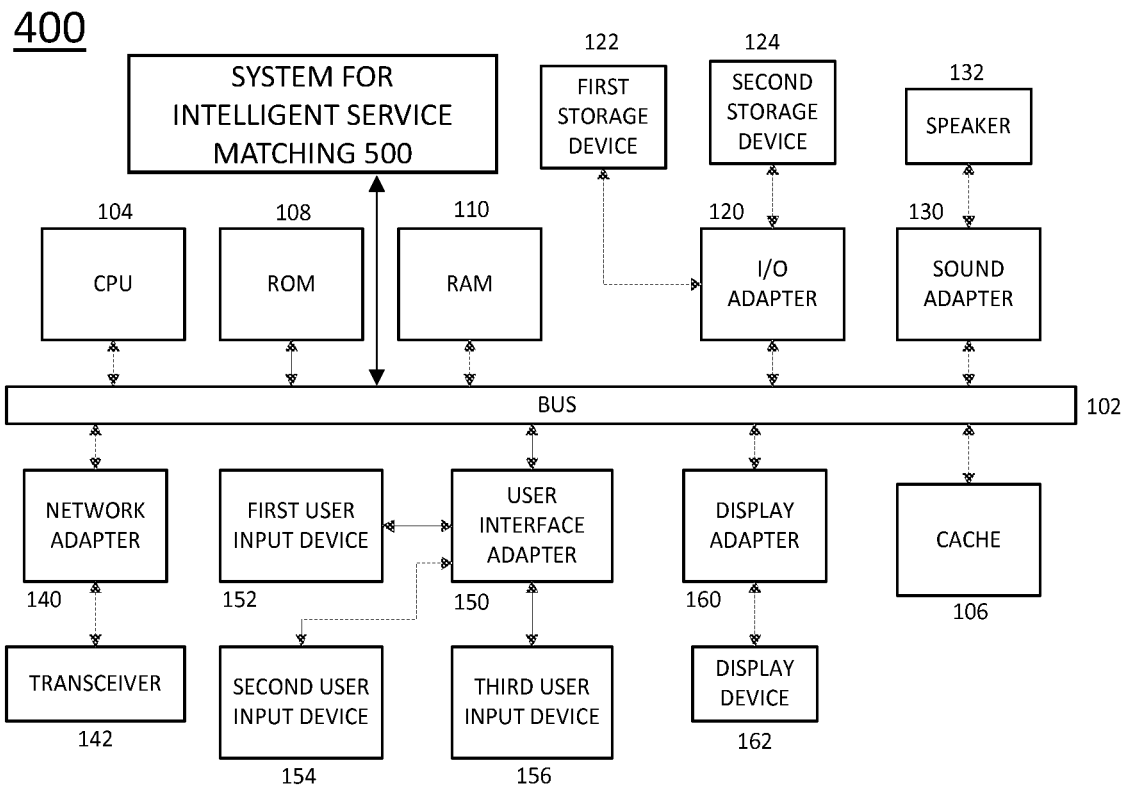
FIG. 5 is a block diagram illustrating a processing system that can incorporate the system for providing a requirement depicted in FIG. 4, in accordance with one embodiment of the present disclosure.

The service matching system 500 may be integrated into the processing system 400 depicted in FIG. 5. The service matching system 500 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The service matching system 500 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the service matching system 500 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the service matching system 500 are readily contemplated by one of ordinary skill in the art given the teachings of the present invention provided herein.

The present invention may be a system, a method, and/or a computer program product at any possible technical detail level of integration. The computer program product can provide intelligent service matching between the products of service providers 15, 15a, and service receivers 10, 20. The computer program product may include a computer readable storage medium (or media) having computer readable program instructions thereon for causing a processor to carry out aspects of the present invention. For example, the present disclosure provides a computer program product comprising a non-transitory computer readable storage medium having computer readable program code embodied therein for providing intelligent service matching. The method provided by the steps stored on the computer program product may include registering at least one of service providers and service receivers as members to a service matching system, wherein the service matching system collects data from the members, wherein permission to collect data from the members is revocable at any time by the members. The method further includes taking an order from a first service receiver to receive goods from a service provider. The method determines a route of the first service receiver to obtain the goods from the service provider. The method further includes matching the route of the first service receiver with a potential delivery route to a second service receive having an order with the service provider. The method offers a promotion to the first service receiver to deliver the order by the second service receiver with the service provider over the potential delivery route.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
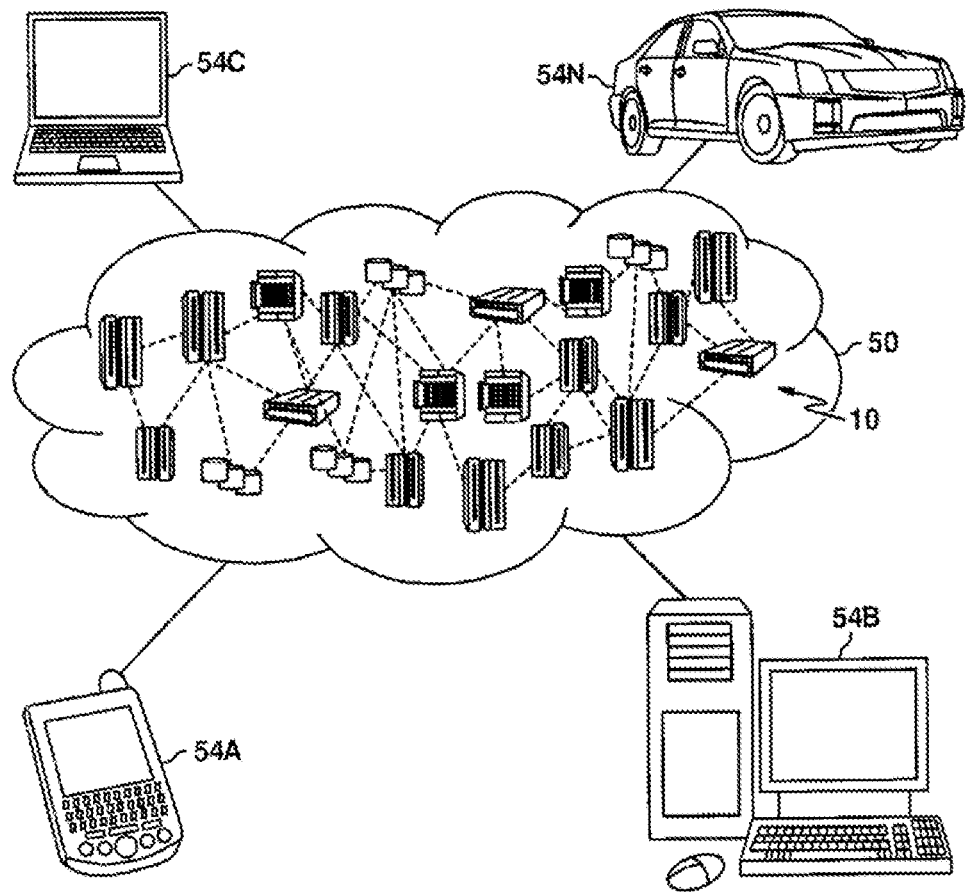
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 7:
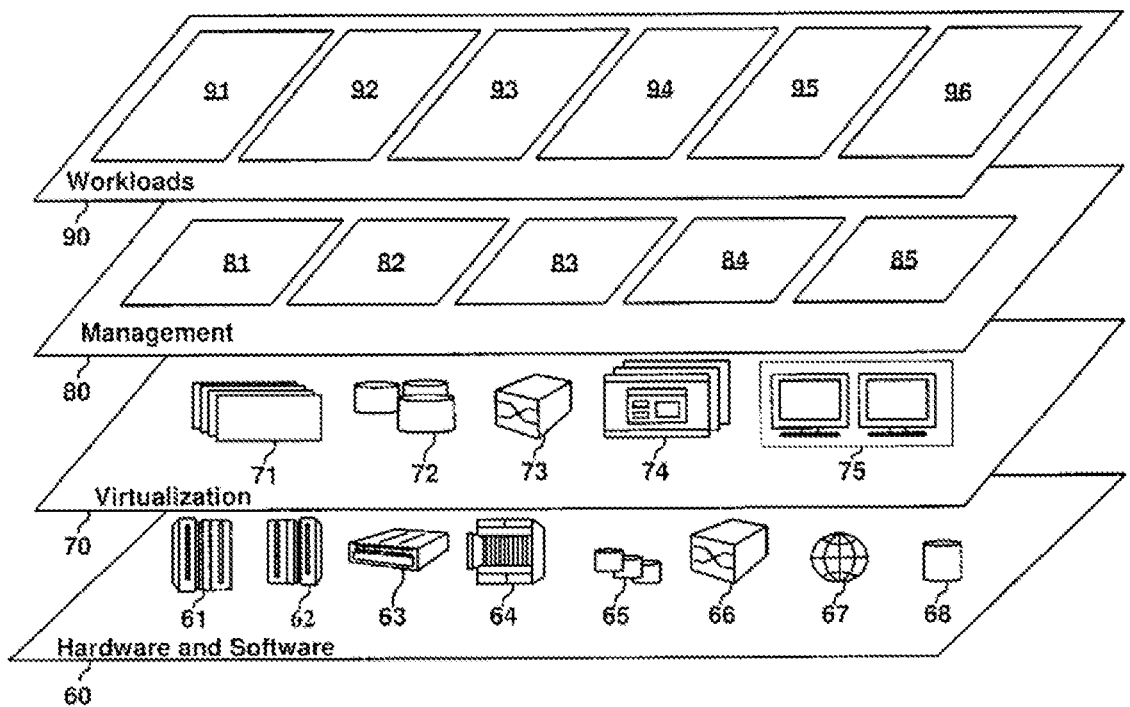
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the intelligent service matching system 500, which is described with reference to FIGS. 1-7.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of an intelligent service matching system (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for matching services to potential receivers of the services comprising:
  registering at least one of service providers and service receivers as members of a service matching system, wherein the service matching system collects data from the members, wherein the registering of the at least one of service providers and service receivers includes storing data regarding order history from service providers and travel trends in receiving goods respective to those service providers in a membership database;
  taking an order from a first service receiver to receive goods from a service provider;
  calculating a route of the first service receiver to obtain the goods from the service provider;
  matching the route of the first service receiver with a potential delivery route to a second service receiver having an order with the service provider, wherein the matching the route includes employing a matching engine having an artificial neural network configured for pattern recognition and access to a map of the first service receiver and the second service receiver as well as access to travel habits of the first service receiver, wherein the matching engine uses the neural network and the travel habits to provide the potential delivery route to the second service receiver; and offering via wireless communication a promotion to the first service receiver to deliver the order by the second service receiver with the service provider over the potential delivery route.

2. The computer implemented method of claim 1, wherein the taking of the order comprises the first service receiver entering order information through a receiver interface, the receiver interface being in wireless communication with the service matching system.

3. The computer implemented method of claim 2, wherein the second service receiver having the order with the service provider entered the order into the service matching system using the receiver interface.

4. The computer implemented method of claim 1, wherein the method further includes the first service receiver accepting the promotion to deliver the order by the second service receiver over the potential delivery route.

5. The computer implemented method of claim 1, wherein the first and second service receivers live in the same town.

6. The computer implemented method of claim 1, wherein the potential delivery route includes the first service receiver delivering goods to the second service receiver between a visit by the first service receiver to a first service provider and a visit by the first service received to a second service provider.

7. The computer implemented method of claim 1, wherein the promotion is a reduction in the price of services to the first service receiver provided by the service provider.

8. The computer implemented method of claim 1, wherein the promotion is a free service or free good provided by the service provider to the first service receiver.

9. A computer implemented method for matching services to potential receivers of the services comprising:

registering at least one of service providers and service receivers as members of a service matching system;

taking an order from a first service receiver to receive goods from a service provider;

calculating a route of the first service receiver to obtain the goods from the service provider, wherein the calculating of the route of the first service receiver to obtain the goods from the service provider includes having a plurality of maps and a global positioning system interface to the first service receiver;

matching the route of the first service receiver with a potential delivery route to a second service receiver having an order with the service provider, wherein the matching of the route of the first service receiver with the potential delivery route to the second service receiver having the order with the service provider comprises employing artificial intelligence to match the routes from a route calculator with destinations for the first and second service receiver that are stored on a membership database, the artificial intelligence employing an artificial neural network configured for pattern recognition and access to a map of the first service receiver and the second service receiver, as well as access to travel habits of the first service receiver, wherein the matching uses the neural network and the travel habits to provide the potential delivery route to the second service receiver; and offering a promotion to the first service receiver to deliver the order by the second service receiver with the service provider over the potential delivery route.

10. A computer program product for matching services of service providers with service receivers, the computer program product comprising a non-transitory computer readable storage medium having program instructions embodied therewith, the program instructions executable by a processor to cause the processor to:

register, using the processor, at least one of service providers and service receivers as members of a service matching system, wherein the service matching system collects data from the members, wherein permission to collect data from the members is revocable at any time by the members, wherein the registering of the at least one of service providers and service receivers includes storing data regarding order history from service providers and travel trends in receiving goods respective to those service providers in a membership database;

take, using the processor, an order from a first service receiver to receive goods from a service provider;

calculate, using the processor, a route of the first service receiver to obtain the goods from the service provider;

match, using the processor, the route of the first service receiver with a potential delivery route to a second service receiver having an order with the service provider, wherein said matching the route includes employing a matching engine having an artificial neural network configured for pattern recognition and access to a map of the first service receiver and the second service receiver, as well as access to travel habits of the first service receiver, wherein the matching engine uses the neural network and the travel habits to provide the potential delivery route to the second service receiver; and offer, using the processor, a promotion to the first service receiver to deliver the order by the second service receiver with the service provider over the potential delivery route.

11. The computer program product of claim 10, wherein the taking of the order comprises the first service receiver entering order information through a receiver interface, the receiver interface being in wireless communication with the service matching system.

* * * * *